United States Patent [19]

Yōshidōme

[11] Patent Number: 4,580,253
[45] Date of Patent: Apr. 1, 1986

[54] DIRECT ACCESS APPARATUS AND METHOD FOR VIDEO DISC PLAYER

[75] Inventor: Seikou Yōshidōme, Fukaya, Japan

[73] Assignee: Tokyo Shibaura Denki Kabushiki Kaisha, Kawasaki, Japan

[21] Appl. No.: 489,385

[22] Filed: Apr. 28, 1983

[30] Foreign Application Priority Data

Apr. 30, 1982 [JP] Japan .................................. 57-72736

[51] Int. Cl.$^4$ .............................................. G11B 17/00
[52] U.S. Cl. ........................................ 369/32; 358/907
[58] Field of Search ....................... 369/30, 32, 43, 54, 369/48, 111, 126; 358/342, 907; 360/78

[56] References Cited

U.S. PATENT DOCUMENTS

| | | | |
|---|---|---|---|
| 4,135,086 | 1/1979 | Baba ........................ | 369/32 |
| 4,408,312 | 10/1983 | Sugiyama et al. ............ | 369/32 |
| 4,413,292 | 11/1983 | Sugiyama et al. ............ | 369/32 |
| 4,428,074 | 1/1984 | Abe et al. ................ | 369/32 |

FOREIGN PATENT DOCUMENTS 0030317 6/1981 European Pat. Off. .
2657916 7/1977 Fed. Rep. of Germany .
2949015 6/1981 Fed. Rep. of Germany .

Primary Examiner—Donald McElheny, Jr.
Attorney, Agent, or Firm—Cushman, Darby & Cushman

[57] ABSTRACT

A code signal is intermittently recorded on each recording track of a video disc so as to indicate a groove number. The code signal is picked up by a stylus and is detected by a code signal detector. The detected signal is supplied to a time converter and is converted to detected time data. When the code signal cannot be detected, a detection signal from an arm position detector is used to produce detected time data. Meanwhile, assigned time data is produced by a keyboard and a key input processing circuit. Part of the assigned time data is corrected by a correcting circuit so as to decrease the speed of an arm mechanism before a desired track position. The detected time data and the assigned time data are supplied to a comparator from their upper bits through first and second data selectors, respectively, and are compared. The comparator produces a control signal every time a coincidence is detected. The control signal is suppled to a motor drive circuit through lines so as to decrease the speed of an arm motor.

19 Claims, 4 Drawing Figures

DIRECT ACCESS APPARATUS AND METHOD FOR VIDEO DISC PLAYER

BACKGROUND OF THE INVENTION

The present invention relates to a direct access apparatus and method for a video disc player which can detect a pickup point of a video disc at a high speed.

Conventionally, a rotary disc (to be referred to as a video disc hereinafter) is used as a video signal reproducing medium in a video disc player. The video dics is placed on a turntable and is driven to reproduce video signals therefrom. Spiral recording tracks are formed on the surface of the video disc, and video signals recorded along these tracks are reproduced. A capacitance video disc system and an optical video disc system are both well known as typical video reproduction systems. The video disc rotates together with the turntable and a pickup means traces the signal recording tracks along the video disc, thereby reproducing signals via the pickup means. The pickup means comprises a light source and a photosensor in the optical video disc system, and a stylus electrode which opposes an electrode on the recording tracks in the capacitance video disc system. The stylus is mounted at the distal end of a stylus arm. The stylus arm is fed by an arm mechanism along the video disc to be parallel thereto. In general, the arm mechanism can be moved by an arm feed motor in a radius direction of the video disc. When the arm mechanism is placed above the surface of the video disc, a magnetic means is used to bring the stylus into contact with the recording track of the video disc or to separate it therefrom.

A video disc direct access function is employed in the video disc player of the type described above so as to allow rapid location of a desired position (the startpoint of the recorded signals). When the video disc player has such a direct access function, groove (track) number data recorded on the video disc can be reproduced as a code signal which is then compared with a desired key input signal from a keyboard. When the code signal coincides with the key input signal, a position designated by these signals is determined to be the proper startpoint, thereby starting proper reproduction.

When the direct access function mode is set, the signal corresponding to groove number data and reproduced from the video disc must be monitored during the access operation. In the video disc which has grooves along the recording tracks and which performs signal reproduction by slice sliding contact, the arm feed motor must be rotated at a high speed so as to locate a desired position, while the stylus slidably contacts the surface of the video disc. However, such high-speed operation of the motor causes damage to the video disc or wear and damage to the stylus. If the motor is rotated at a speed so as not to damage the video disc and stylus, however, the time required to find a desired position is prolonged.

SUMMARY OF THE INVENTION

The present invention has been made in consideration of the conventional drawbacks described above, and has for its object to provide a direct access apparatus for properly locating a desired position on a recording track at high speed without damaging a stylus even when a groove is formed along the recording track.

In order to achieve the above object of the present invention, there is provided a direct access apparatus for a video disc player, which reproduces a disc-shaped recording medium which has spiral recording tracks on a rotary surface thereof so as to intermittently record a code signal corresponding to a number which differs for each of the recording tracks, comprising;

an arm mechanism for moving in a radius direction above and along a top surface of said disc-shaped recording medium;

an arm motor for driving said arm mechanism;

motor driving means for switching a rotational speed and a rotational direction of said arm motor;

a stylus for picking up at least a signal corresponding to the code signal when said stylus is moved downward from said arm mechanism and is brought into contact with the recording track;

lifter driving means for selectively bringing said stylus into contact with the recording track and separating said stylus therefrom;

code signal detecting means for receiving a signal from said stylus so as to detect the code signal among the signals picked up by said stylus;

arm position detecting means for detecting a signal generated when said arm mechanism is moved, thereby producing a detection signal;

time converting means, connected to output terminals of said code signal detecting means and said arm position detecting means, for converting the code signal to time data when the code signal from said code signal detecting means is received, and for converting the detection signal to the detected time data when only the detection signal is received from said arm position detecting means;

first memory means, connected to an output terminal of said time converting means, for latching the detected time data;

first data selector means, connected to an output terminal of said first memory means, for reading out the detected time data;

assigned time data generating means for generating assigned time data in response to a manual input operation;

second memory means, connected to an output terminal of said assigned time data generating means, for latching the assigned time data;

correcting means, connected to an output terminal of said second memory means, for correcting assigned time data by incrementing or decrementing the assigned time data in accordance with a moving direction of said arm mechanism, thereby producing corrected time data;

second data selector means, connected to said output terminal of said second memory means, for reading out the assigned time data from said correcting means;

comparator means, one input terminal of which is connected to an output terminal of said first data selector means and the other input terminal of which is connected to an output terminal of said second data selector means, said comparator means being adapted to detect whether or not input data received from said first and second data selector means coincide with each other; and counting means, connected to a coincidence pulse output terminal of said comparator means, for counting a coincidence pulse; and whereby a control signal from said counting means is supplied to said control terminal of said lifter driving means so as to allow said lifter driving means to move said stylus downward when said comparator means detects a coincidence between the corrected time data and detected time data from said first data selector means.

DETAILED DESCRIPTION OF THE PREFERRED EMBODIMENT

Figure 1:
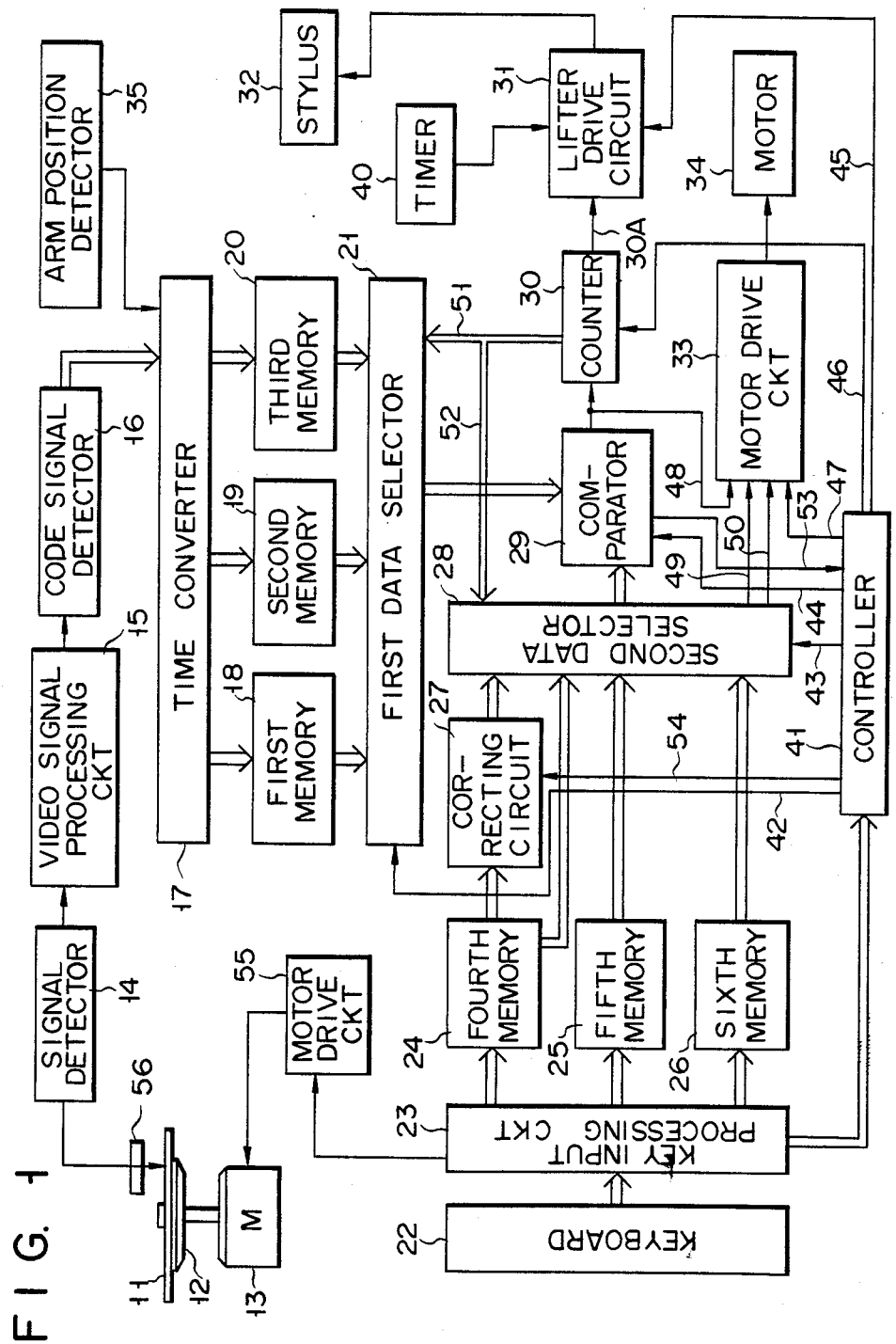
FIG. 1 is a block diagram of a direct access apparatus according to an embodiment of the present invention.

A direct access apparatus and method according to an embodiment of the present invention will be described with reference to the accompanying drawings. Referring to FIG. 1, a video disc 11 is placed on a turntable 12 of a video disc player. The turntable 12 is rotated by a motor 13. The motor 13 is rotated by a motor drive circuit 55 at a constant speed when the operator depresses a play button on a keyboard 22.

A signal detector 14 detects a signal from a stylus which is brought into slidable contact with the video disc 11. A detected signal is then supplied to a video signal processing circuit 15. The video signal processing circuit 15 FM-detects and frequency-converts the detected signal so as to produce a video signal to be monitored by a television signal. The stylus is fed by an arm mechanism 56. The arm mechanism 56 is moved above and along the video disc 11 to be parallel thereto. The arm mechanism 56 is driven by an arm feed motor (not shown).

The video signal from the video signal processing circuit 15 includes a code signal which indicates a groove number. The code signal is extracted by a code signal detector 16, and an extracted code signal is then supplied to a time converter 17. The groove number is included as a code signal during a vertical sync signal period of the video signal. The video signal data of each recording track (groove) corresponds to an 8-field video signal. Therefore, eight vertical sync signal periods are present in each spiral groove. A single groove number is indicated by the eight vertical sync signal periods.

The time converter 17 performs time data conversion into units of minutes, tens-of-seconds, and seconds (to be referred to hereinafter as minute data, 10-second data and unit second data, respectively). The time data indicates music performance time from the startpoint to the present position when the video disc is played back from the beginning. In other words, the time data corresponds to the groove number in accordance with a pre-calculated time interval between the startpoint time and a time at which the stylus reaches each recording track, when the video disc 11 is played back from the beginning.

The minute data, the 10-second data, and the unit second data from the time converter 17 are latched by first, second and third memories 18, 19 and 20, respectively. Note that the storage contents are updated when the input data is changed. The minute, 10-second, and unit second data are supplied to a first data selector 21.

Reference numeral 22 denotes a keyboard. The operator can specify a desired startpoint using an operation key on the keyboard 22, and this position is specified by minutes and seconds in the normal reproduction mode. An input signal from the operation key is converted by a key input processing circuit 23 to minute data, 10-second data and unit second data which are respectively latched by fourth, fifth and sixth memories 24, 25 and 26. The minute data in the fourth memory 24 is corrected by a correcting circuit 27 so as to subtract, for example, two minutes therefrom. The corrected minute data is then supplied to a second data selector 28. The 10-second data and the unit second data respectively stored in the fifth and sixth memories 25 and 26 are supplied directly to the second data selector 28.

Assume that the desired startpoint is specified by the operator at the keyboard 22, and that the corresponding minute data, 10-second data and unit second data are stored in the second data selector 28. When the video disc player is set in the play mode, the first and second data selectors 21 and 28 first select the minute data. These minute data are then compared by a comparator 29 so as to determine which data is greater. The groove number of the video disc 11 is detected when a stylus 32 is first brought into contact with a corresponding recording track in the play mode. The stylus 32 is moved upward or downward by a lifter drive circuit 31 which controls the magnetic means in the arm mechanism 56.

The play mode of the video disc player is also detected by a controller 41. The controller 41 supplies a control signal to the lifter drive circuit 31 through a control line 45 so as to move the stylus 32 downward for a predetermined time interval (e.g., a time interval corresponding to one revolution of the video disc 11 at the normal speed). The controller 41 then supplies a control signal to the first and second data selectors 21 and 28 through control lines 42 and 43, respectively, so as to allow the first and second data selectors 21 and 28 to select the minute data. The first and second data selectors 21 and 28 produce the minute data, respectively. At the same time, the controller 41 supplies a control signal to the comparator 29 through a control line 44, thereby starting the comparator 29.

The comparator 29 compares the minute data originally supplied from the code signal detector 16 (to be referred to as detected minute data) and the minute data originally supplied from the keyboard 22 (to be referred to as assigned minute data). When the detected minute data is greater than the assigned minute data, the comparator 29 produces a control signal of logic level "1". Otherwise, the comparator 29 produces a control signal of logic level "0". The control signal is supplied to the controller 41 through a signal line 53. The controller 41 supplies a control signal to the correcting circuit 27 through a control line 54 in accordance with the signal of logic level "1" or "0" supplied through the signal line 53. The correcting circuit 27 increments or decrements the minute data in accordance with the control signal from the controller 41 so as to produce corrected minute data. When the control signal on the signal line 53 is "1" the assigned minute data is increased, and when the control signal on the signal line 53 is "0" the assigned minute data is decreased.

Furthermore, the controller 41 supplies a reset pulse to a counter 30 through a control line 46. Thereafter, a control signal is supplied from the counter 30 to the lifter drive circuit 31. The controller 41 supplies a start signal to a motor drive circuit 33 through a control line 47.

The lifter drive circuit 31 controls the arm of the stylus to move the stylus 32 downward or upward in accordance with the output appearing at a control line 30A of the counter 30. When the detected minute data and the assigned minute data greatly differ from each other in the comparison by the comparator 29, the counter 30 is kept in the initial state, so that the lifter drive circuit 31 causes the arm of the stylus 32 to keep the stylus 32 in the upward position. The comparator 29 then supplies a high-speed feed signal to a motor drive circuit 33 through the control line 47 so as to drive an arm feed motor 34 at a high speed (since the coincidence output was not produced by the comparator 29).

Since the stylus 32 is not brought into slidable contact with the video disc 11, the code signal which corresponds to a groove number cannot be detected. For this reason, data is supplied from an arm position detector 35 to the time converter 17.

Figure 2:
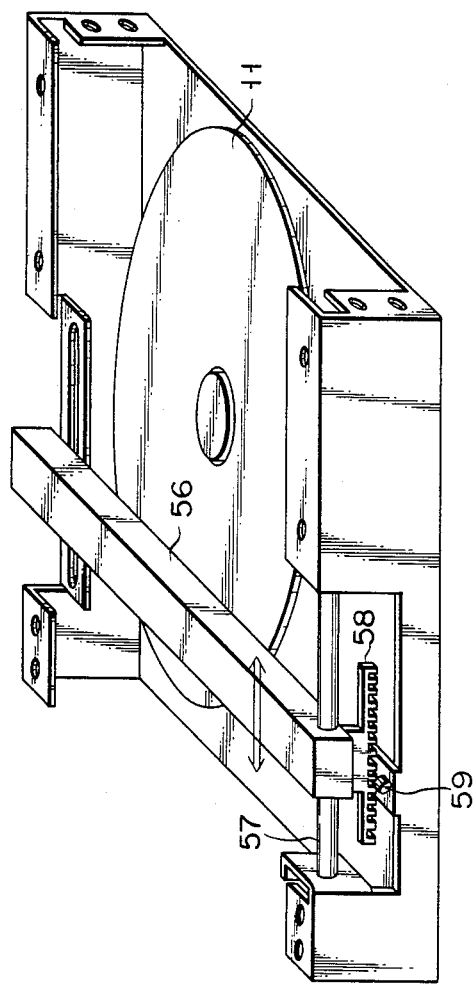
FIG. 2 is a perspective view showing part of an arm position detector shown in FIG. 1.

The arm position detector 35 produces arm position data (substantially corresponding to the position which is indicated by the groove number) by a circuit arrangement shown in FIG. 2. Referring to FIG. 2, the arm mechanism 56 is moved in a radius direction above and along the video disc 11 to be parallel thereto. The arm mechanism 56 is then driven by the motor 34. The arm mechanism 56 is supported by a guide rail 57 disposed in a direction parallel to the radius direction of the turntable. Racks 58 are disposed at the arm mechanism 56 along its feed direction. A light source (not shown) and a photosensor 59 are disposed at two sides of a set of the racks 58 so as to oppose each other. Therefore, when the arm mechanism 56 is moved parallel to the turntable, the racks 58 intermittently interrupt light emitted from the light source to be incident on the photosensor 59. The photosensor 44 then produces a pulse signal. The arm position detector 35 generates data which indicates one minute every time the pulse signal is received. This data is added to or subtracted from data stored in the first memory 18. The content of the first memory 18 is updated in accordance with the moving direction of the arm mechanism 56. When the arm mechanism 56 is fed at a high speed, the recording track position detection data from the stylus 32 is temporarily replaced with data from the arm position detector 35.

When the arm mechanism 56 is fed at a high speed, the contents of the first, second and third memories 18, 19 and 20 are sequentially updated. First, the minute data are compared to determine whether or not a coincidence signal can be produced. The minute data in the fourth memory 24 is corrected by the correcting circuit 27 by a value corresponding to, for example, about 2 minutes. This is because the arm mechanism 56 is fed at a high speed and requires some time before it can stop. Thus, the minute data is corrected by predicting overdriving, so that the corrected minute data coincides with the assigned minute data two minutes before a time specified by the assigned minute data. In the high speed feed state, when the minute data coincide with each other, the comparator 29 supplies a pulse to the counter 30. The count of the counter 30 is moved up by one. In this condition, the first and second data selectors 21 and 28 select 10-second data stored in the second and fifth memories 19 and 25, respectively. The respective 10-second data are then supplied to the comparator 29. The increase in the count of the counter 30 allows control of the lifter drive circuit 31, so that the stylus 32 is moved downward and is brought into slidable contact with the video disc 11. In the above-mentioned condition, the motor drive circuit 33 controls the motor 34 in accordance with the output signal from the comparator 29, so that the motor 34 is driven at a speed which will not damage the video disc or the stylus. For example, the motor speed in this condition is 32 times the normal speed.

As described above, when the corrected minute data coincides with the assigned minute data two minutes before the time indicated by the assigned minute data, and then when the stylus 32 is brought into slidable contact with the recording track of the video disc 11, the actual code signal is converted to time data by the time converter 17.

When the 10-second data coincide with each other subsequently, the count of the counter 30 is moved up by one. The first and second data selectors 21 and 28 select unit second data from the third and sixth memories 20 and 26 in accordance with the count of the counter 30. The coincidence of the 10-second data allows control of the motor drive circuit 33. Thus, the rotational speed of the motor 34 is set to be, for example, 16 times the normal speed.

When the unit second data then coincide with each other, the motor drive circuit 33 is rotated at the normal speed in accordance with the coincidence signal. The coincidence of the unit second data also allows the release of video muting of the video amplifier.

In the arm position detector 35, in order to correct the assigned minute data by the correcting circuit 27, two-minute late (+2) data and two-minute fast (−2) data can be produced so as to correspond to the movement directions from an outer track to an inner track and from the inner track to the outer track (i.e., the directions along which the stylus overruns are opposite). The two-minute late or fast data is selected in accordance with a comparison result obtained by comparing the the assigned minute data in the fourth memory 24 and the detected minute data in the first data selector 21 by the comparator 29. If the assigned minute data is smaller than the detected minute data, the motor drive circuit 33 drives the motor 34 in the reverse direction, so that the arm mechanism 41 is moved from an inner position to an outer position of the video disc. Otherwise, the motor drive circuit 33 drives the motor 34 in the forward direction.

The count output from the counter 30 is used as a control signal for the first and second data selectors 21 and 28. More specifically, the control signal is supplied to the control ends of the first and second data selectors 21 and 28 through lines 51 and 52, respectively. When the output signal from the counter 30 is set to be "0", the first and second data selectors 21 and 28 select the data from the first and fourth memories 18 and 24, respectively. These data are then supplied to the comparator 29. However, when the output signal from the counter 30 is set to be "1", the first and second data selectors 21 and 28 select data from the second and fifth memories 19 and 25, respectively. The selected data are then supplied to the comparator 29. Furthermore, when the output signal from the counter 30 is set to be "2", the first and second data selectors 21 and 28 select data from the third and fourth memories 20 and 26, respectively. These selected data are then supplied to the comparator 29.

The output data from the comparator 29 is supplied to the motor drive circuit 33 through a control line 48. The motor drive circuit 33 also receives the output data from the second data selector 28 through control lines 49 and 50. The motor drive circuit 33 drives the motor 34 at a high speed when the signals on the control lines 48, 49 and 50 are kept low and the signal on the control line 47 is kept high. When the high level pulse (coincidence pulse) from the control line 48 is supplied to the motor drive circuit 33 to keep the control line 49 high (i.e., when the 10-second data is selected), the rotational speed of the motor 34 is set to be 32 times the normal speed. When the motor drive circuit 33 receives the coincidence pulse from the control line 48 and the control line 50 is kept high (i.e., when the unit second data is selected), the rotational speed of the motor 34 is set to be 16 times the normal speed. Furthermore, when the motor drive circuit 33 receives the coincidence pulse from the control line 48 and the control lines 49 and 50 are kept low, the rotational speed of the motor drive circuit 33 is set to be the normal speed.

Figure 3:
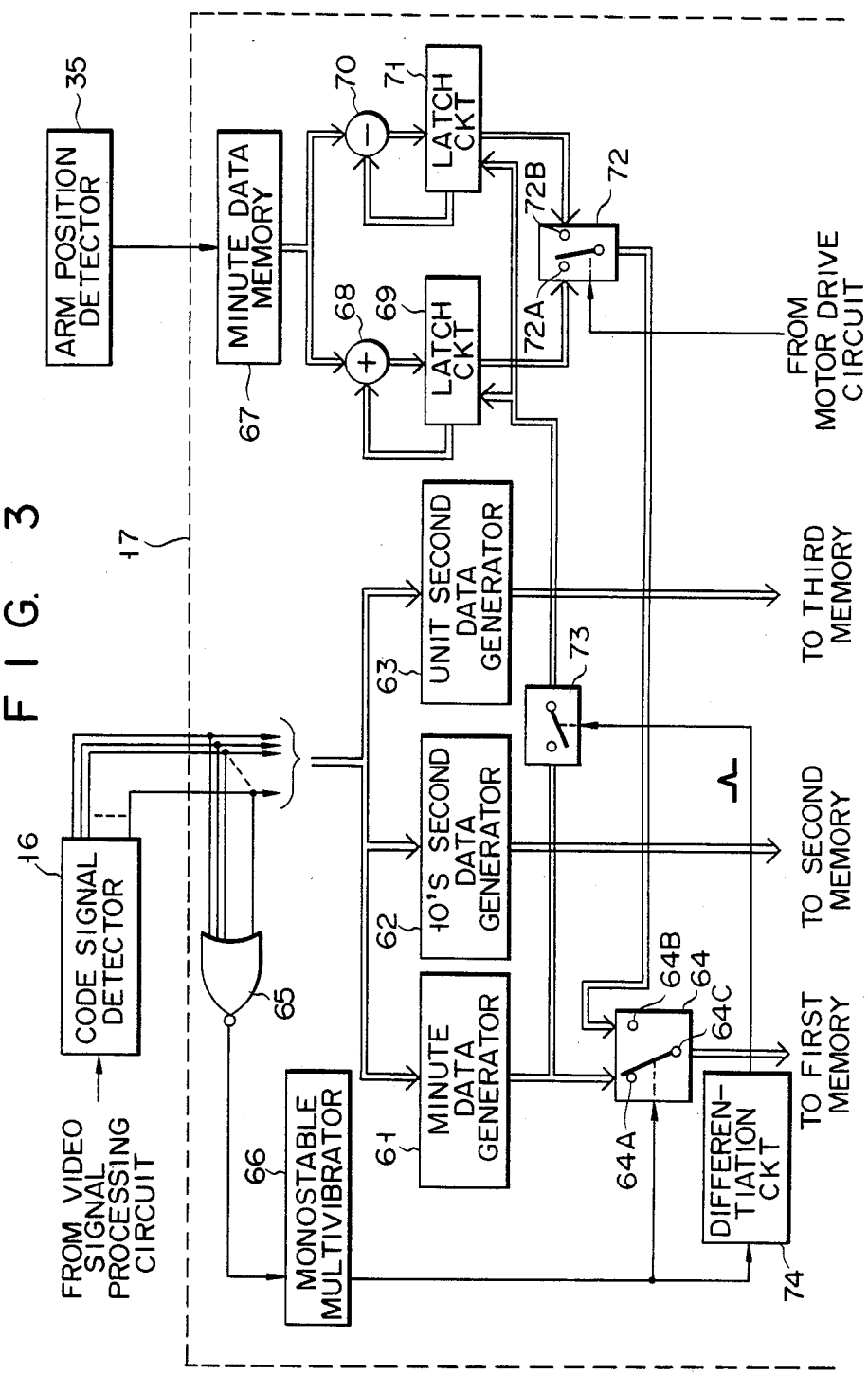
FIG. 3 is a detailed block diagram of a time converter shown in FIG. 1.

FIG. 3 shows a detailed arrangement of the time converter 17 shown in FIG. 1. Output data from the code signal detector 16 is supplied to a minute data generator 61, a 10-second data generator 62, and a unit second data generator 63. These generators 61, 62 and 63 generate corresponding time data. Output signals from the 10-second data generator 62 and the unit second data generator 63 are supplied directly to the second and third memories 19 and 20, respectively. The output signal from the minute data generator 61, however, is supplied to the first memory 18 through a switch 64.

The switch 64 is controlled by an output signal from an all "0" detector (i.e., a NOR gate 65). When an output signal from the NOR gate 65 is set to be at a low level, contacts 64A and 64C of the switch 64 are rendered conductive. However, when the NOR gate 65 is set to be all "0" (i.e., no code signal is present), a contact 64B is connected to the contact 64C of the switch 64. In this case, the code signal is intermittently obtained for each vertical sync signal period, so that the output signal from the NOR gate 65 is supplied to a control contact of the switch 64 through a monostable multivibrator 66. When the code signal is detected within a predetermined period, an output signal from the monostable multivibrator 66 is constantly kept low, so that the switch 64 is operated to supply an output from the minute data generator 61 to the first memory 18.

Meanwhile, the output signal from the arm position detector 35 is supplied to a read control terminal of a minute data memory 67. Upon reception of the read pulse from the arm position detector 35, the minute data memory 67 reads out correction data for correcting the time data (e.g., by 2 minutes). The correction data is supplied to an adder 68 and a subtractor 70. The adder 68 adds the correction data and the data from a latch circuit 69 every time the correction data is supplied thereto. Updated data from the adder 68 is latched by the latch circuit 69. On the other hand, the subtractor 70 subtracts the correction data from the data of a latch circuit 71 every time correction data is supplied thereto. Updated data is then latched by the latch circuit 71.

The contents of the latch circuits 69 and 71 are thus updated every time the correction data is obtained. The output data from the minute data generator 61 is used as the initial data for the latch circuits 69 and 71. The output data from the minute data generator 61 is supplied to the latch circuits 69 and 71 through a switch 73. The switch 73 is closed when it receives at its control terminal a differentiated pulse from a differentiation circuit 74 for differentiating the output from the monostable multivibrator 66 at its trailing edge. The switch 73 then supplies the output data from the minute data generator 61 to the latch circuits 69 and 71.

The output data from the latch circuits 69 and 71 are supplied to contacts 72A and 72B of a switch 72, respectively. The switch 72 selects one of the contacts 72A and 72B in accordance with the rotational direction of the motor 34 (i.e., the feed direction of the arm mechanism) and supplies the signal appearing at the selected contact to the contact 64B of the switch 64. The switch 72 selects one of the contacts 72A and 72B in accordance with, for example, the control signal from the motor drive circuit 33. When the arm mechanism 56 is fed from an outer position to an inner position of the video disc, the switch 72 selects the contact 72A. However, when the arm mechanism 56 is fed from the inner position to the outer position of the video disc, the switch 72 selects the contact 72B.

Figure 4:
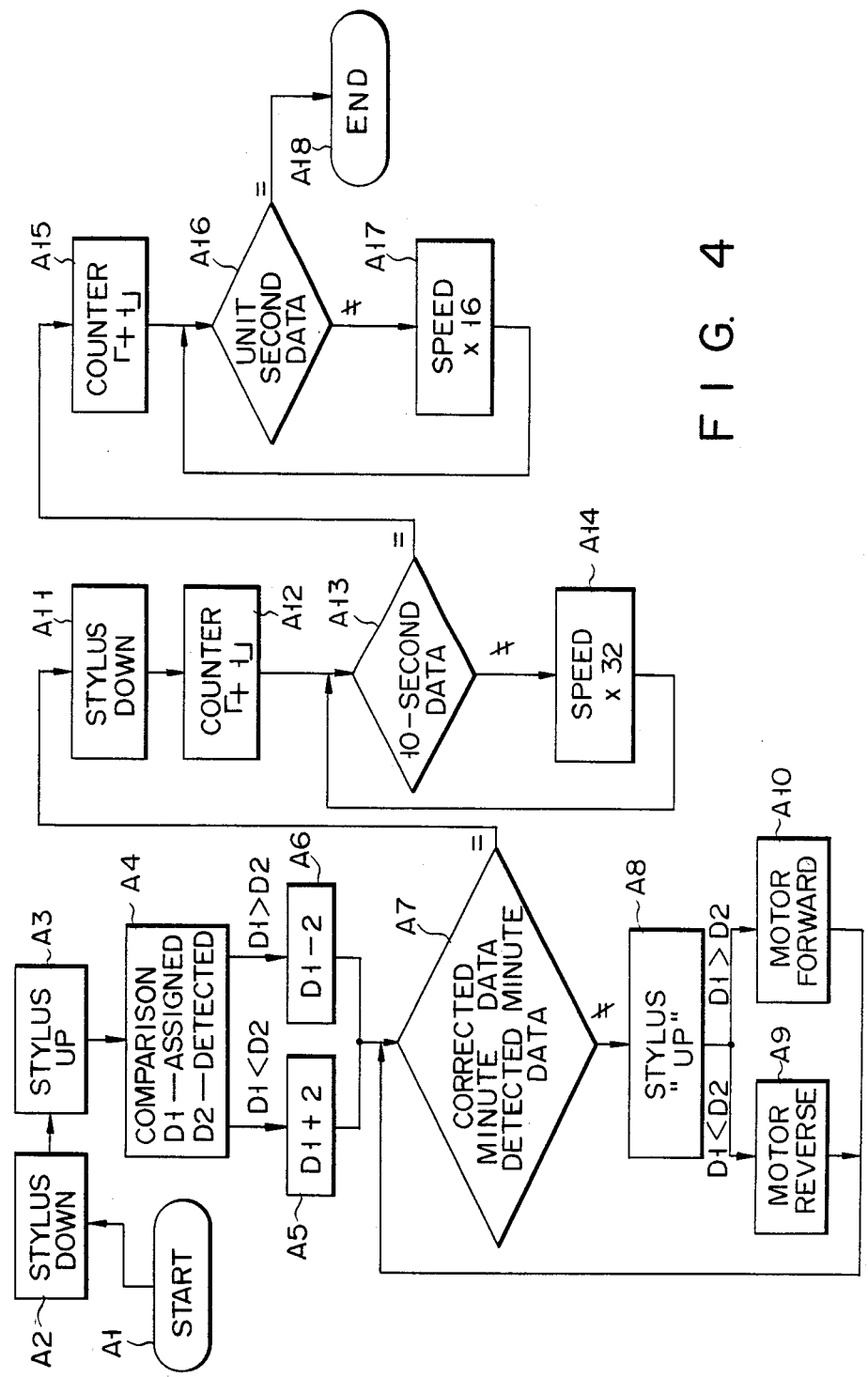
FIG. 4 is a flow chart for explaining the operation of the direct access apparatus shown in FIG. 1.

FIG. 4 is a flow chart for explaining the operation of the direct access apparatus according to the present invention. In this case, the video disc player is set in the playback mode in step A1. The stylus is moved downward for a predetermined time interval in steps A2 and A3. Assigned minute data D1 is compared with detected minute data D2 in step A4. If D1>D2, the assigned minute data D1 is increased by 2 minutes in step A5. This corrected minute data is used for comparison in step A7. However, if D1>D2, the assigned minute data D1 is decreased by two seconds in step A6. This corrected data is similarly used for comparison. The corrected assigned minute data will be referred to as corrected minute data hereinafter for descriptive convenience. In step A7 it is determined whether or not the corrected minute data coincides with the detected minute data. If they do not coincide, the stylus is kept in the raised position in step A8, and the motor 34 is driven at a high speed in steps A9 and A10. In this case, the rotational direction of the motor 34 is determined in accordance with the determination result in step A4. The flow then returns to step A7, and therein it is subsequently determined whether or not the corrected minute data coincides with the detected minute data. If the coincidence is established, the routine jumps to step A11. In step A11, the stylus is moved downward, and data conversion is performed in accordance with the code signal corresponding to the actual groove number. In step A12, the count of the counter 30 is moved up by one. It is then determined in step A13 whether or not the 10-second data coincide with each other. If it is determined in step A13 that they do not coincide, the rotational speed of the motor is set to be, for example, 32 times the normal speed in step A14 so as not to damage the stylus and the video disc. Subsequently, when the coincidence of the 10-second data is detected, the count of the counter 30 is further moved up by one in step A15. It is then determined in step A16 whether or not the unit second data coincide with each other. If no correspondence is detected, the arm feed speed is decreased to be 16 times the normal feed speed. Subsequently, the unit second data are compared. If the unit second data coincide, the routine advances to step 18 to complete the direct access.

The time converter 17 shown in FIG. 1 is arranged to convert the code signal, which has priority over any other signal, to time data. However, if the code signal is not present, the output data from the arm position detector 35 can be converted to time data. According to the present invention, a timer circuit 40 can be arranged to forcibly move the stylus downward so as to detect the code signal even if the stylus is being kept in the raised position. More specifically, if the corrected minute data and the detected minute data differ greatly, an error becomes great when the detected minute data is produced only from the output signal from the arm position detector shown in FIG. 2 in step A5. Therefore, the stylus 32 is sometimes moved downward by means of the timer circuit 40 to detect the actual code signal on the video disc, thereby correcting the data in the first memory 18.

According to the present invention, when the desired track position of the video disc greatly differs from the present stylus position in units of minutes, the stylus is kept upward, and the arm mechanism is driven, thereby moving the stylus near the desired track at a high speed. Therefore, a high-speed search can be performed without damaging the stylus or the video disc.

The stylus is then moved downward at a position near the desired track position and is brought into slidable contact with the disc so as to locate the desired track from the actual code signal, thereby properly performing direct access.

What is claimed is:

1. A direct access apparatus adapted for reproducing information stored on a disc-shaped recording medium of the type defining a plurality of interconnected recording tracks on a first surface thereof, said plurality of tracks comprising a continuous path capable of being tracked by a stylus means, said tracks each storing an identification code signal, said apparatus comprising;

means for rotating said medium at a constant angular velocity;

an arm mechanism moveable along at least one radius of said disc-shaped recording medium above and parallel to said first surface of said medium;

arm position controlling means, operatively connected to said arm mechanism, for controlling the speed and direction of movement of said arm mechanism;

stylus means, supported by said arm mechanism, for reproducing at an output thereof at least a code signal stored on one of said tracks when said stylus means is moved into a first position whereat said stylus means is in contact with said first surface to track said one recording track;

lifter driving means for moving said stylus means from a second position whereat said stylus means is not in contact with said first surface to said first position in response to a stylus control signal;

code signal detecting means, connected to receive the output of said stylus means, for detecting the code signal reproduced by said stylus means and for rejecting any other signals reproduced by said stylus means;

arm position detecting means for detecting the position of said arm mechanism;

time converting means, connected to receive the detected code signal produced by said code signal detecting means and the detected arm position produced by said arm position detecting means, for calculating, from the detected code signal, indicia of the time duration necessary for said stylus means to reach the position on the plurality of interconnected tracks corresponding to said detected code signal by tracking said path from a predetermined starting position while said medium is rotating at said constant angular velocity, and alternately for calculating said indicia of duration from said detected arm mechanism position in the absence of said detected code signal;

first memory means for storing said calculated indicia of duration;

first data selector means, operatively connected to said first memory means, for selectively reading said stored calculated indicia of duration;

desired data generating means, manipulable by a user, for generating in response to user manipulation, at an output thereof, indicia of time duration necessary for said stylus means to reach a desired position, programmable by said user, on the plurality of interconnected recording tracks by tracking said path from said predetermined starting position while said medium is rotating at said constant angular velocity;

second memory means, connected to said output of said desired data generating means, for storing the indicia of duration generated by said desired data generating means;

correcting means, operatively connected to said second memory means, for changing said generated duration indicia produced by said generating means in response to at least the direction of movement of said arm mechanism;

second data selector means, operatively connected to said second memory means, for selectively reading said stored changed indicia;

comparator means, connected to receive, at one input thereof, said calculated indicia of duration read by said first data selector means and to receive, at another input thereof, said stored changed indicia read by said second data selector means, for producing a pulse whenever the indicia applied to said one input is equal to the indicia applied to said other input; and counting means, connected to receive the pulses produced by said comparator means, for counting said pulses and for applying said stylus control signal responsive to the value of said count, causing said lifter driving means to move said stylus means into contact with said first surface of said medium whenever said comparator means detects a coincidence between the calculated indicia of duration and the changed generated indicia of duration.

2. An apparatus according to claim 1, further comprising, a first control signal line, connected between an output terminal of said counting means and a control terminal of said lifter driving means, for supplying a control signal to said control terminal of said lifter driving means so as to allow said lifter driving means to move said stylus means downward when said comparator means detects a coincidence;

a second control sginal line connected between the output terminal of said counting means and a control terminal of said first data selector means, and between said output terminal of said counting means and a control terminal of said second data selector means, said second control signal line being adapted to control each of said first and second data selector means to sequentially select and produce most significant bit data in response to said control; and motor speed switching means, operatively connected to said arm position controlling means, for selectively changing the rate of movement of said arm mechanism between a high speed and a normal speed in response to selection by said comparator means of least significant bit data.

3. An apparatus according to claim 1, wherein:
said detected code signal includes minuted data, 10-second data and unit second data; and
said first memory means comprises first, second and thrid memories connected to receive the calculation of said time: converting means so as to respectively latch the detected minute data, detected 10-second data and detected unit second data which are included in the detected code signal.

4. An apparatus according to claim 1, wherein:
said indicia produced by said desired data generating means includes minute data, 10-second data and unit second data; and
said second memory means comprises fourth, fifth and sixth memories connected to said output terminal of said desired data generating means so as to respectively latch assigned minute data, assigned 10-second data, and assgined unit second data which is included in the indicia produced by said desired data generating means.

5. An apparatus according to claim 1, wherein said arm position controlling means is responsive to a selected data output terminal of said first data selector means.

6. An apparatus according to claim 1, wherein said arm position controlling means is responsive to said count data output terminal of said counting means.

7. An apparatus according to claim 1, wherein said arm position controlling means is responsive to a selected data output terminal of said second data selector means.

8. An apparatus according to claim 1, wherein said lifter driving means includes a timing and control means for forcibly and intermittently moving said stylus means to said first position during a time when said lifter driving means is operating to keep said stylus means in said second position after a predetermined time has elapsed since said lifter driving means moved said stylus means to said second position.

9. An apparatus for positioning a stylus means at a desired position on a discoid storage medium, said medium of the type having a plurality of sequential addresses stored on a surface thereof, each of said addresses including a value indicating the position on said medium at which said address is stored relative to a predetermined initial position on said medium, said apparatus comprising:
means for rotating said medium at a nominal angular velocity;
stylus means for reproducing information stored on said medium;
means for inputting a value representing a desired position on said medium;
means for moving said stylus means between a raised position whereat said stylus means is not in contact with said medium and a lowered position whereat said stylus means is in contact with said medium;
means operatively connected to said stylus means for reading a position value stored at the position on said medium in registry with said contacting stylus means and for producing said read value at an output thereof;
means connected to the output of said reading means for storing said read value;
means for a determiing whether the value stored in said storing means differs from the value inputted by said inputting means by more than a selected one of a first predetermined amount and a second predetermined amount less than said first predetermined amount;
means, operatively connected to said determining means, for displacing said stylus means in said raised position along a path parallel to said medium surface in a direction determined by the sign of the difference between said value stored by said storing means and said value inputted by said inputting means;
means for changing the value stored by said storing means in response to the distance and direction said stylus means is displaced by said displacing means; and
means for controlling said moving means to move said stylus means to said lowered position and for controlling said determining means to selected said second predetermined amount in response to a determination by said determining means that the stored value differs from the inputted value by less than said first predetermined amount, and for controlling said rotating means to temporarily rotate said medium at a first angular velocity exceeding said nominal angular velocity in response to a determination by said determining means that said stored value differs from said inputted value by more than said second predtermined amount.

10. An apparatus as in claim 9 further including sensing means for sensing the distance said stylus means is moved by said displacing means, wherein said changing means changes the value stored in said storing means in response to said sensed distance.

11. An apparatus as in claim 10 further including means for offsetting the value inputted at said means for inputting by a predetermined offset.

12. An apparatus as in claim 11 wherein said offsetting means includes:
means for adding said predtermined offset to said inputted value if said displacing means displaces said stylus means in a direction away from said predetermined position on said medium; and
means for subtracting said predetermined offset from said inputted value if said displacing step displaces said stylus means in a direction toward said predetermined position on said medium.

13. An apparatus as in claim 9 further including:
timing means for timing a predetermined period of time beginning at a time the stylus means is moved to said raised position; and
means for controlling said moving means to move said stylus means to said lowered position if said predetermined period of time timed by said timing means elapses prior to a determination by said determining means that said value stored in said storing means differs from said value inputted by said inputtting means by less than said first predetermined amount.

14. A method of positioning a stylus at a desired position on a discoid storage medium rotating at a nominal angular velocity, said medium of the type having a plurality of sequential addresses stored on a surface thereof, each of said addresses including a value indicating the position on said medium at which said address is stored relative to a predetermined position on said medium, said method comprising the steps of:

(1) inputting a value representing a desired position on said medium;

(2) moving a stylus from a raised position whereat said stylus is not in contact with said medium to a lower position whereat said stylus is in contact with said medium;

(3) reading a position value address stored at the position on said medium in registry with said contacting stylus;

(4) storing the value read by said reading step (3);

(5) moving said stylus from said lowered position to said raised position;

(6) determining whether the value stored by said storing step (4) differs from the value inputted by said inputting step (1) by more than a first predetermined amount;

(7) if the determining step (6) determines that said stored value differs from the inputted value by more than said first predetermined amount, performing the following steps:

(a) displacing said stylus in said raised position along the path parallel to the surface of said medium in a direction determined by the sign of the difference between said stored value and said inputted value, (b) changing the value stored by said storing storing step (4) in response to the distance and direction said stylus is displaced by said displacing step (a), and (c) repeating said steps (6) and (7);

(8) if said determining step (6) determines the value stored by said storing step (4) does not differ from said inputted value by more than said first predetermined amount, performing the following steps:

(d) repeating steps (2), (3) and (4), (e) determining whether the value stored by said repeated storing step (4) differs from the value inputted by said inputting step (1) by more than a second predetermined amount less than a said first predetermined amount, and (f) if the determining step (e) determines said stored value differs from said inputted value by more than said second predetermined amount, temporarily rotating said medium at a first angular velocity exceeding said nominal angular velocity, repeating said steps (3) and (4), and repeating said steps (e) and (f).

15. A method as in claim 14 wherein said value changing step (b) includes the steps of:

sensing the distance said stylus is moved by said displacing step (a); and changing the value stored by said storing step (4) in response to said sensed distance.

16. A method as in claim 15 wherein said step (7) further includes the step of offsetting the value inputted by said inputting step (1) by a predetermined offset.

17. A method as in claim 16 wherein said offsetting step includes the steps of:

adding said predetermined offset to said inputted value if said displacing step displaces said stylus in a direction away from said predetermined position on said medium; and subtracting said predetermined offset from said inputted value if said displacing step displaces said stylus in a direction towards said predetermined position on said medium.

18. A method as in claim 14 further including the steps of:

subsequent to said moving step (5), timing of a predetermined period of time; and if said predetermined period of time timed by said timing step elapses prior to the determining step (6) determining that said stored value differs from said inputted value by less than said first predetermined amount, repeating steps (2) through (5).

19. A method as in claim 14 further including the step of:

(9) if said determining step (e) determines said stored value differs from said inputted value by less than said second predetermined amount, performing the following steps:

(g) determining whether the values stored by said repeated storing step (4) differs from the value inputted by said inputting step (1) by more than a third predetermined amount less than said second predetermined amount, and (h) if said determining step (g) determines said stored value differs from said inputted value by more than said third predetermined amount, temporarily rotating said medium at a second angular velocity exceeding said nominal angular velocity but less than said first angular velocity, repeating said steps (3) and (4), and repeating said steps (g) and (h).

* * * * *